United States Patent [19]

Rochla

[11] 4,083,747

[45] Apr. 11, 1978

[54] APPARATUS FOR MAKING STACKS OF PLASTICS BAGS

[75] Inventor: Kurt Rochla, Lengerich, Germany

[73] Assignee: Windmoller & Holscher, Lengerich, Germany

[21] Appl. No.: 746,724

[22] Filed: Dec. 2, 1976

[30] Foreign Application Priority Data

Dec. 3, 1975 Germany ............................ 2554395

[51] Int. Cl.$^2$ ........................ B31B 1/98; B31B 23/14; B32B 31/18

[52] U.S. Cl. ........................................ 156/510; 83/96; 93/33 H; 93/DIG. 1; 156/252; 156/512; 156/515; 214/6 F

[58] Field of Search ............... 156/510, 515, 252, 251, 156/497, 498, 512, 563, 558, 253; 93/33 H, DIG. 1, 33 R, 35 R, 8 R, 93 HT; 83/90, 86, 96, 29; 214/6 F, 6 H; 270/82, 85; 271/220; 225/96.5, 103

[56] References Cited

U.S. PATENT DOCUMENTS

| | | | |
|---|---|---|---|
| 3,215,048 | 11/1965 | Gattrugeri | 93/35 R |
| 3,217,573 | 11/1965 | Flacke et al. | 83/96 |
| 3,456,855 | 7/1969 | Mutter | 93/33 R |
| 3,587,410 | 6/1971 | Dechanciaux | 93/33 H |
| 3,616,090 | 10/1971 | Larson | 156/563 X |
| 3,675,542 | 7/1972 | Torigoe | 93/35 R |
| 3,711,680 | 1/1973 | Bennington | 93/DIG. 1 X |
| 3,731,823 | 5/1973 | Goth | 214/6 F |
| 3,810,420 | 5/1974 | Ravel | 93/33 H X |
| 3,926,081 | 12/1975 | Roberts | 83/96 |

*Primary Examiner*—David Klein
*Assistant Examiner*—M. G. Wityshyn
*Attorney, Agent, or Firm*—Fleit & Jacobson

[57] ABSTRACT

A web of tubular or semi-tubular film is provided with transversely extending weld seams and lines of perforations to define bag sections and it is cooled while being fed to a severing and stacking station where the leading bag section is severed from the film and deposited on a stack of bag sections. The successively severed bag sections are deposited on a lowerable support up to a desired stacking height and they are clamped to the support alternately by a vertically reciprocatable punch and by being pressed against a clamping bar disposed above the support. Each bag is severed from the web of film under the action of lowering the punch and depressed by said punch until its margins come to lie under the clamping bar.

5 Claims, 6 Drawing Figures

APPARATUS FOR MAKING STACKS OF PLASTICS BAGS

The invention relates to a method of making stacks of plastics bags from tubular or semi-tubular webs of thermoplastic plastics film, in which the bags are deposited on one another on a lowerable support up to a desired stacking height and clamped thereon alternately by a punch or by pressure against a clamping bar disposed above the support, the bags being severed from the web of film during lowering of the punch and being depressed until their margins come to lie under the clamping bar and are pressed thereagainst when the punch is raised to deliver a new bag, and to an apparatus for performing this method.

In an apparatus known from German Auslegeschrift 1 930 841 and working by this method, the top of the clamping bar disposed above the support is in the form of a welding jaw which co-operates with a backing jaw and is provided with a severing knife so that, during each lowering movement of the backing jaw, a weld seam for the bag is formed and a bag is severed from the intermittently advanced web of film. The punch that is lowered together with the backing welding jaw depresses the severed bag against the support or the stack of bags formed thereon until its margin is disposed beneath the clamping bar and, after raising of the punch, it or the stack of bags formed on the support becomes clamped between the clamping bar and the support. In the known method there is a danger that the superposed bags just formed with their base weld seams become welded or adhered to one another. Adhesion can be avoided in the known method by reducing the speed of the machine whereby the cooling period for the welded seams is prolonged. An adequate cooling period for the welded seams is also available if long bags or sacks are being made because in that case the time interval between the welding operations is longer by reason of feeding a longer tube section. Since thicker films retain the welding heat for a longer time and cool off more slowly than thinner films, the risk of adhesion is particularly great when making bags or sacks from thicker films.

From German Offenlegungsschrift 2 335 485 it is known to avoid the adhesion of the weld seams by clamping the bags only at their side margins during stacking, so that the fresh weld seams are not pressed on top of one another. Since the fresh weld seams of the bags are nevertheless superposed during stacking, interadhesion is not avoided with certainty.

It is therefore the problem of the invention to suggest a method by which even short bags made from webs of film of any desired thickness can be processed at a high machine speed without the danger of adhesion.

This problem is solved according to the invention in a method of the aforementioned kind in that the web of film is provided with transversely extending weld seams and lines of perforations and is cooled and the leading bag is subsequently torn therefrom after depositing on the stack. In the method according to the invention, the web of film provided with transverse weld seams is cooled and the bags are severed therefrom only when the weld seams are no longer adhesive. The speed of machines working by the method according to the invention is limited neither by the bag length nor the film thickness because the cooling path can be made as long as is desired.

An apparatus for performing the method of the invention comprising transverse welding means and means for severing bags from the web with transverse welding seams and for stacking same, the severing and stacking means comprising a support for the bags to be stacked, the support being depressible against a spring force, a raisable punch which can be lowered onto the support to depress same, a clamping bar which is disposed above the support, is fixed with respect to the frame and against the underside of which the support can press when the punch is raised, and a raisable and lowerable punch acting on the top of the clamping bar, is characterised in that the transverse welding means are connected to the severing and stacking means by a conveying path which cools the transverse weld seams of the web of film and means are provided for transversely perforating the web of film, and that the punches for tearing off each leading bag from the web of film along the transverse line of perforations are substantially simultaneously lowerable onto the web of film to both sides of the transverse line of perforations.

Desirably, the punch lowerable on to the clamping bar consists of a resiliently mounted depresser and the punch depressing the support consists of an elongated depresser reciprocatable therewith. The support can be formed by a depositing table.

In an embodiment of the invention, a horizontal pair of plates is disposed above the reciprocatable depositing table at a spacing from each other that is somewhat larger than the width of the depresser, and the depresser comprises horizontally directed blow holes which are connected to a source of compressed air and by which the deposited bag is laterally flattened beneath the pair of plates. By means of the clamping bar, the bag is passed between the plates of the pair of plates as the depositing table is lowered and they are spread out by means of the blown air of the clamping bar on top of the bag that has already been deposited on the depositing table. Welding bands lengthwise of and/or transversely to the feeding direction of the chain of bags may be provided at the underside of the plates of the pair of plates for welding the deposited bags to one another to form a block of bags.

By means of this construction, it is for the first time possible to provide in an advantageous manner an apparatus with which the bags can be deposited either to form loose stacks of bags or to form blocks of bags.

Further, the depositing table may be in the form of a grate and lowerable to an extreme lower position under a belt guide at this position, the stacks of bags being fed to this belt guide for further processing or for depositing.

In a further development of the invention, the chain of bags may be feedable along the cooling path by belts or along a supporting plate by blown air. When advancing the chain of bags by means of blown air, the cooling path can be kept short in a particularly favourable manner and nevertheless achieve adequate cooling.

The supporting plate of the cooling path may consist of two overlapping sections of which one half is connected to the welding and perforating station and the other half is connected to the tear-off and collecting station and the stations are relatively displaceable in the feeding direction of the chain of bags. In this way the spacing between these stations can be changed at will and adapted to the length of the bags to be made.

An example is illustrated in the drawing and will now be described in more detail. In the drawings.

Figure 1:
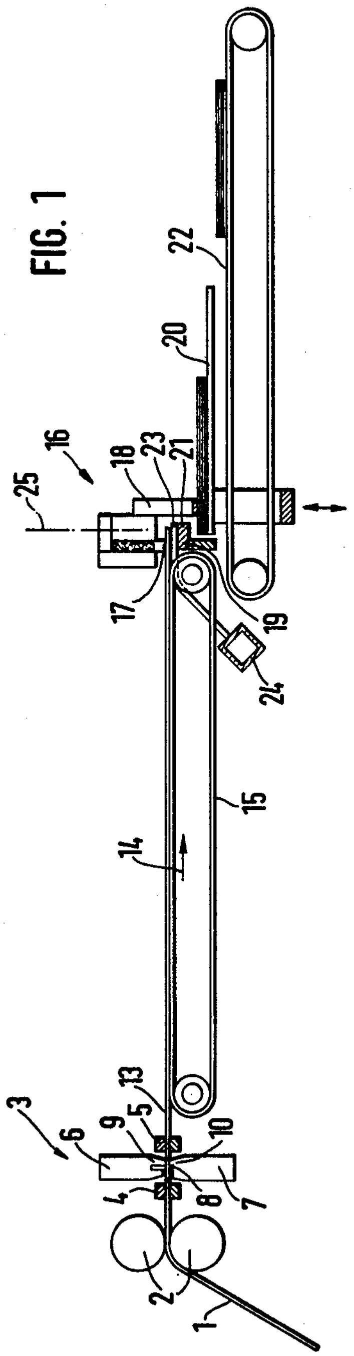
FIG. 1 is a diagrammatic side elevation of an apparatus for making and stacking bags or sacks.

A tube or semi-tube 1 advanced from the left-hand side is intermittently fed by a pair 2 of tension rollers and fed to a perforating and welding station 3. The latter consists of pairs 4, 5 of clamping jaws and a perforating and welding beam 6, 7 having a perforating knife 8 and welding bars 9, 10. The tube or semi-tube 1 is provided with perforation and weld seams 11, 12 across the width of the tube by lowering the welding beam 6. The resulting chain 13 of bags is fed by the upper runs of a belt conveyor 15 that move in the direction of the arrow 14. At a spacing from the perforating and welding station 3 equal to or a multiple of the length of the bags of the chain 13 of bags there is a tear-off and collecting station 16 which consists of a reciprocatable upper portion with a resilient depresser 17 and a rigid clamping bar 18 as well as a lower portion 19 which is fixed with respect to the frame and on which the resilient clamping bar 17 is supported. The rigid clamping bar 18 co-operates with a depositing table 20 which is reciprocatable, in the form of a grate and, under the influence of a spring (not shown), lies in its upper extreme position against a projecting bar 21 of the fixed lower portion 19. Beneath the depositing table 20 there is a belt conveyor 22 of which the individual belts are at a spacing from one another such that the grates of the depositing table 20 can pass therebetween during lowering to an extreme low position. Lowering of the depositing table 20 is carried out by a drive mechanism (not shown).

At the level of the upper run of the belt conveyor 15 and flush with the upper edge of the fixed lower portion 19, blow tubes 23 pointing in the running direction of the upper runs of the belt conveyor 15 are provided between the belts and are fed by a common air conduit 24.

After perforation and transverse welding, the chain 13 of bags is intermittently advanced along the belt conveyor 15 acting as a cooling path. The welding seams can cool off in the time they take to traverse this path. The length of the belt conveyor 15 is such that the foremost perforated seam lies substantially in a plane indicated by the chain-dotted line 25. By means of the blown air leaving the blow tubes 23, the last bag attached to the chain 13 of bags is laid flat on the depositing table 20 which is located in its uppermost position. During descent of the upper portion of the tear-off and collecting station 16, the part of the chain 13 of bags lying in front of the line of perforations disposed in the plane 25 is held between the resilient clamping bar 17 and the fixed lower portion 19, whilst the bag disposed on the depositing table 20 is held between the rigid clamping bar 18 and the depositing table 20. By further lowering of the upper portion of the tear-off and collecting station 16, the line of perforation becomes overstretched and the bag disposed on the depositing table 20 is torn from the chain of bags. Upon ascent of the upper portion, the depositing table 20 follows this motion and clamps between itself and the underside of the bar 21 that part of the bag that is adjacent the perforated seam. In this way the bag just severed and the previously deposited bags are not disturbed from their planar position when the blown air is now started for spreading the next bag. After stacking a number of bags, the depositing table 20 is lowered beneath the upper run of the belt conveyor 22 so that the stack lies on the belt conveyor 22 and is taken away thereby.

Figure 2:
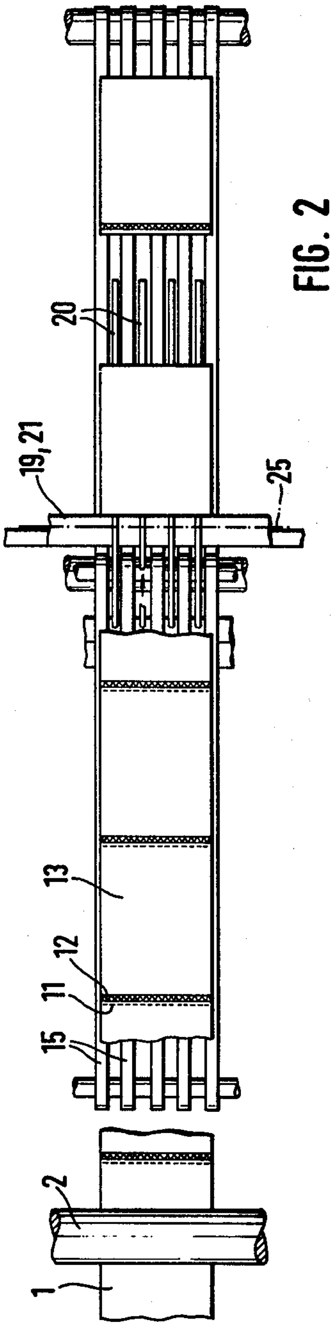
FIG. 2 is a plan view thereof.
Figure 3:
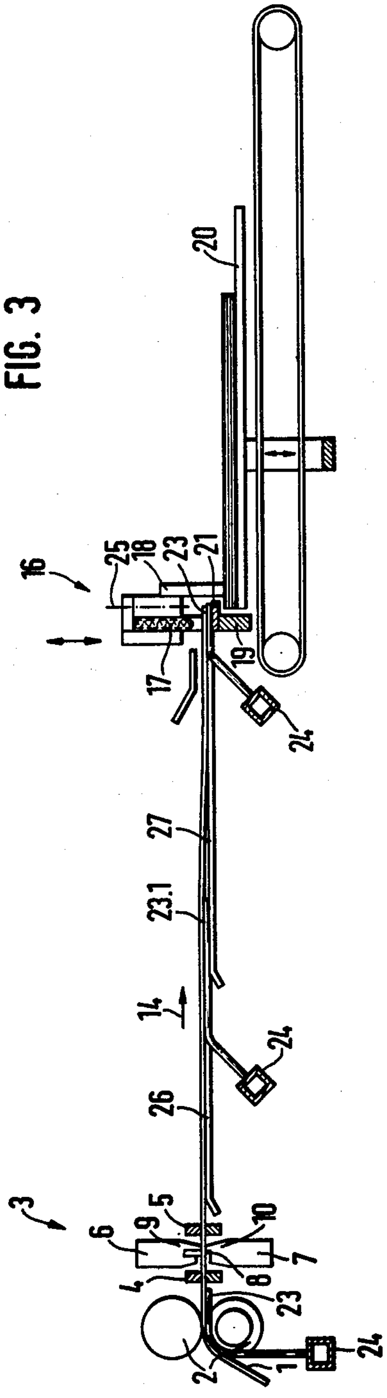
FIG. 3 is a diagrammatic side elevation as in FIG. 1 but with a cooling path on which the chain of bags is advanced by means of blown air.

In FIG. 3, the cooling path consisting of the belt conveyor 13 in FIGS. 1 and 2 is replaced by guide plates 26 and 27 of which the one 26 is fixed to the perforating and welding station 3 and the other 27 is fixed to the tear-off and collecting station 16. The guide plates 26, 27 overlap, the end of the plate 26 preferably lying over the beginning of the plate 27. One of these stations 3, 16 is displaceable (in a manner not shown) in the direction in which the chain of bags is conveyed. By changing the spacing between both stations, the machine can be set to the bags to be made so that the line of perforations is disposed in the plane 25 between the last bag and the chain of bags. For conveying the chain 13 of bags, blown air is used which is blown out of blow tubes 23.1 in the direction of movement of the chain of bags (arrow 14). A set of such blow tubes 23.1 is provided in juxtaposed grooves of the lower roller of the pair 2 of tension rollers and a further set is disposed in grooves of the plate 26. The blow tubes 23 and 23.1 are fed by air conduits 24. The chain of bags is advanced by one bag length by starting the pair 2 of tension rollers and by a corresponding running period of these rollers as well as by switching on the blown air. The welded seams of the chain 13 of bags are cooled by the ejected blown air. This effect is also produced by the plates 26, 27 which preferably consist of a good conductor material and cool the chain of bags, whereby the cooling effect is increased.

Figures 4, 5, 6:
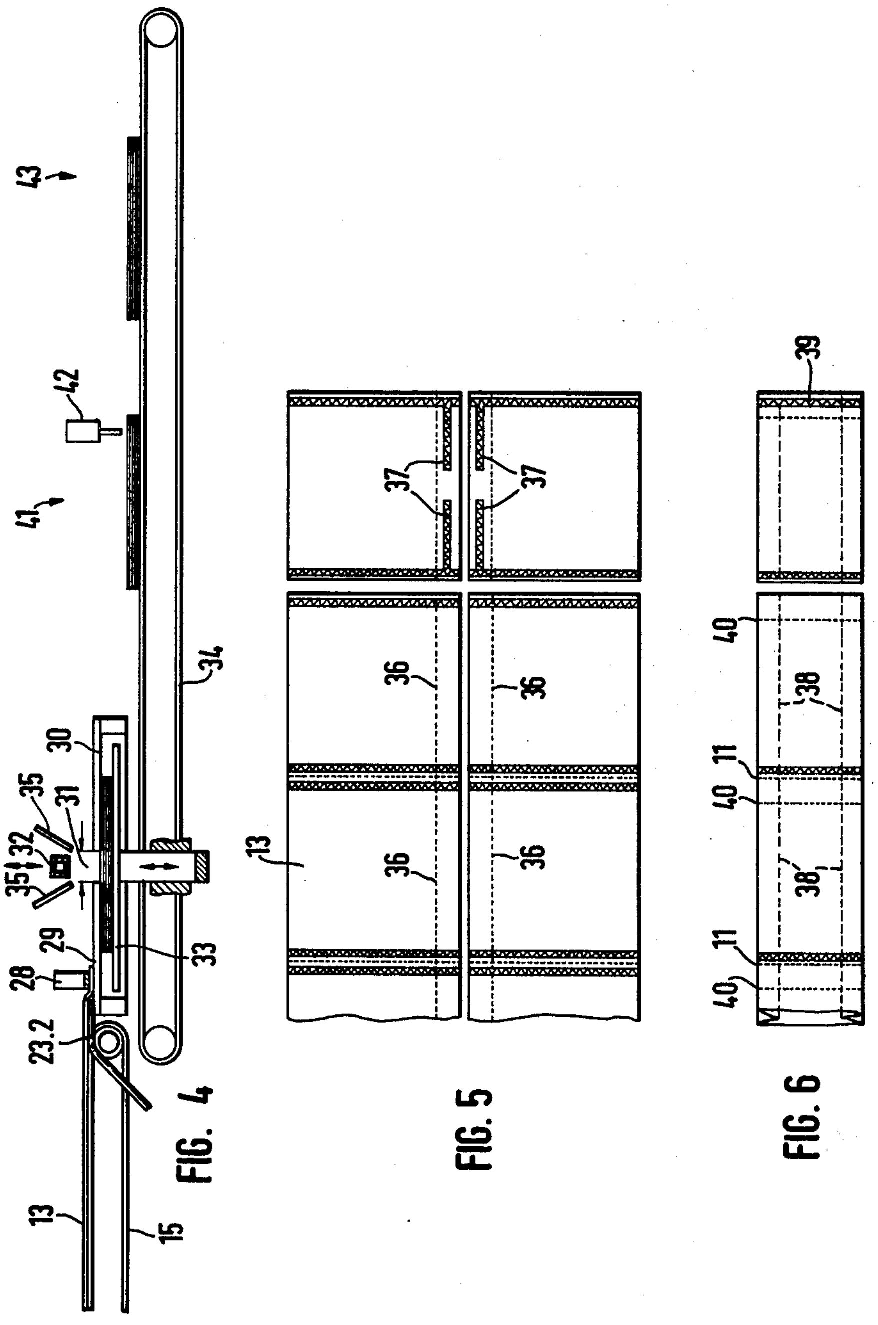
FIG. 4 is a modification of the tear-off and collection station.
FIGS. 5 and 6 are plan views of differently constructed chains of bags.

A modification of the tear-off and collecting station 16 is shown in FIG. 4. The chain 13 of bags coming from the cooling path consisting of the plates 26, 27 or the belt conveyor 15 is stretched, as in the FIGS. 1 and 3 apparatus, by blown air coming from the blow tubes 23.2 and arrives beneath a resilient depresser 28 which can be raised and lowered and runs up against a plate 29 which is fixed with respect to the frame, is substantially flush with the plate 27 or the upper runs of the belt conveyor 15 and, together with a plate 30, forms a table-like pair of plates. The plates 29, 30 are separated by a gap having the spacing 31. The bag to be severed is flattened on the plates 29, 30 by the blown air from the blow tubes 23.2. A clamping bar 32 is disposed in its starting position above the gap. It is in the form of a blow tube having horizontally directed blow holes at both sides and can be reciprocated. Beneath the plates 29, 30 there is a reciprocatable depositing table 33 which is in the form of a grate and which is, as is the pair 29, 30 of plates, of somewhat larger dimensions than the bags to be stacked.

As in the FIGS. 1 and 3 apparatus, a belt conveyor 34 is provided beneath the depositing table 33. During lowering, the grates of the depositing table 33 can pass between the individual belts of the belt conveyor.

Provided adjacent to the clamping bar 32 located in its upper position there are air deflecting plates 35 which deflect the laterally ejected blown air upwardly so that the bag to be severed is effectively spread on the pair 29, 30 of plates. During severing, the resilient depresser 28 moves downwardly and is deposited on the chain of bags that lies on the plate 29. Simultaneously, the clamping bar 32 moves downwardly and the bag to be severed is held between the depositing table 33 and the downwardly moving clamping bar 32. The bag is severed from the chain of bags under tension transversely to the perforated seam 11. After the depositing table 33 has reached a certain spacing from the pair 29, 30 of plates, the parts of the bag pulled into the gap by the clamping bar 32 are engaged by the blown air leaving the clamping bar 32 and spread over the depositing table 33.

During ascent of the upper portion of the tear-off and collecting station or the depresser 28 and the clamping bar 32, the severed bags are held by clamping between the underside of the pair 29, 30 of plates and the depositing table 33.

Welding bands may be provided at the underside of the pair 29, 30 of plates; these welding bands weld the deposited bags to each other at suitable positions to form blocks of bags whilst they are in a clamped position. However, the welding bands may also be made inoperative so that no block formation takes place and the bags are deposited in a loosely stacked form.

After a certain number of bags has been stacked, the depositing table 33 is lowered by a drive (not shown) to beneath the lower run of the belt conveyor 34, so that the stack is placed on the upper runs and can be taken away.

FIGS. 5 and 6 illustrate two different chains of bags with severed bags showing the block formation by means of welding bands applied to the underside of the pair 29, 30 of plates. FIG. 5 shows a twin semi-tube slit in the middle so that two mirror-image chains of bags are formed with the filling apertures of the bags pointing to the centre. These chains of bags are perforated at the upper edge parallel thereto and are formed into blocks by the welding bands of the pair 29, 30 of plates above a line 36 of perforations with the aid of block-forming weld seams 37. In use, the individual bags can be torn at the transverse line 36 of perforations from the block portion formed by the block-forming weld seams 37, thereby making available a bag which is open at the top and has bag walls of equal length.

FIG. 6 illustrates a chain of bags formed from a pleated tube having side pleats 38. The bags severed therefrom are interconnected by a block-forming weld seam 39 extending transversely to the bags. Applied at the same time as the lines 11 of transverse perforations for severing the bags there are further lines 40 of perforations disposed parallel thereto and along which the bags can later be torn in use from the block portion formed by the block-forming weld seams 39. The block portions formed by the block-forming weld seams 37 or 39 may be perforated at a diagrammatically illustrated perforating station 41 for the purpose of forming suspension holes, one part 42 of the perforating tool being indicated. The loosely stacked or interconnected blocks of bags are finally supplied to a depositing station 43 by the belt conveyor 34.

I claim:

1. A device for forming stacks of plastic bags from tubular or semi-tubular webs of thermoplastic film comprising: (a) first means for forming transversely extending weld seams and lines of perforations in the web of thermoplastic film; (b) second means for separating individual bags from the welded and perforated web of thermoplastic film along said lines of perforations and for stacking the separated individual bags, said second means having:

1. a vertically movable support for supporting the bags to be stacked,
2. a clamping bar positioned above the movable support,
3. means for urging the movable support towards the bottom of the clamping bar,
4. a first punch movable into engagement with bags supported on said movable support for moving said movable support away from the clamping bar,
5. a second punch movable towards a top surface of the clamping bar for clamping the web of thermoplastic film while an individual bag is being separated from the web along a said line of perforations by the movement of said first punch; and (c) belt conveyor means positioned between said first and said second means for conveying and cooling the web of thermoplastic film from said first to said second means.

2. A device as claimed in claim 1 wherein said belt conveyor means includes a belt conveyor extending horizontally from said first means to said second means for conveying the web of thermoplastic film substantially free from tensile stress.

3. A device for forming stacks of plastic bags from tubular or semi-tubular webs of thermoplastic film comprising: (a) first means for forming transversely extending weld seams and lines of perforations in the web of thermoplastic film; (b) second means for separating individual bags from the welded and perforated web of thermoplastic film along said lines of perforations and for stacking the separated individual bags, said second means having:

1. a movable support for supporting the bags to be stacked,
2. a clamping bar positioned above the movable support,
3. means for urging the movable support towards the bottom of the clamping bar,
4. a first punch movable into engagement with bags supported on said movable support for moving said movable support away from the clamping bar,
5. a second punch movable towards a top surface of the clamping bar for clamping the web of thermoplastic film while an individual bag is being separated from the web along a said line of perforations by the movement of said first punch; and (c) conveying means positioned between said first and said second means for conveying and cooling the web of thermoplastic film from said first to said second means, said conveying means including a supporting and cooling plate means and means for blowing air for advancing the web of thermoplastic film along said plate means, the weld seams being cooled by said plate means and the blowing air.

4. A device as claimed in claim 3 wherein said plate means includes two overlapping plates, one of the plates being connected to said first means and the other plate being connected to said second means.

5. A device as claimed in claim 4 wherein one of said first and second means and its connected plate is movable in the direction of movement of the web of thermoplastic material to adjust the distance between said first and said second means.

* * * * *